Patented Jan. 7, 1941

2,227,808

UNITED STATES PATENT OFFICE 2,227,808

POLYMERIZATION OF STYRENE AND ITS HOMOLOGS

Robert R. Dreisbach, Midland, Mich., assignor to The Dow Chemical Company, Midland, Mich., a corporation of Michigan No Drawing. Application July 18, 1938, Serial No. 219,835

8 Claims. (Cl. 260—669)

This invention concerns an improved method for the polymerization of styrene and its polymerizable homologs.

It is known that activated bleaching earths, such as those commonly sold under the trade names Retrol, Floridin, Tonsil, Afton Clay, Neutrol, fuller's earth, etc., are catalysts for the polymerization of a number of organic compounds, including styrene and certain of its homologs, e. g. alpha-methyl-styrene, ortho-ethyl-styrene, para-chloro-styrene, beta-methyl-styrene, etc. The polymerization of such compounds with the aid of activated bleaching earth catalysts is usually carried out by mixing a small proportion of the catalyst with the compound to be polymerized and thereafter heating the mixture to a polymerizing temperature. When the polymerization is carried out under carefully controlled conditions at a moderately elevated temperature, e. g. 80°–140° C., the products are for the most part liquid polymers of low molecular weight, and are useful in the manufacture of dielectric compositions, varnishes, lacquers, etc. However, the use of activated bleaching earths as polymerization catalysts for styrene and its homologs has not heretofore been commercially successful, since polymerization in the presence of such catalysts takes place with the liberation of much heat, and extremely careful control is required to keep the reaction from taking place abruptly and with almost explosive violence. Dissipation of the heat generated by the reaction becomes more difficult as the batch size of material subjected to polymerization is increased. In order to obtain satisfactory dissipation of the heat of reaction and maintain good temperature control, it is necessary to polymerize the material in small batches, thus necessitating undue handling of the material in manufacturing the polymer on commercial scale. Furthermore, when operating in the known batchwise manner just described, the polymerized material is often obtained as a thick, gummy mass which is inconvenient to handle and from which the catalyst and liquid polymer may be separated only with difficulty.

An object of this invention is to provide a method for the catalytic polymerization of styrene and its polymerizable homologs in the presence of an activated bleaching earth catalyst whereby the temperature of polymerization may be easily controlled. Another object is to provide a method whereby a maximum yield of the low molecular weight liquid polymer is obtained. A further object is to provide a method which is adapted for continuous operation on a large scale.

I have found that the polymerization of styrene and its polymerizable homologs in the presence of an activated bleaching earth polymerization catalyst may be advantageously carried out by contacting the monomeric compound with the catalyst in the presence of from 5 to 20 parts by weight of a reaction medium consisting of the liquid polymerized compound obtained from a previous polymerization. The reaction then takes place smoothly and may readily be carried out in a continuous manner. Moreover, the temperature of reaction is easily controlled, and a maximum yield of the desired liquid polymer is obtained. Furthermore, since the reaction medium corresponds to the product desired, no extra steps for removal of the medium from the product are required.

The optimum conditions for polymerizing styrene and its homologs according to the invention depend somewhat upon the particular compound being polymerized. For example, styrene polymerizes to a certain extent when contacted with an activated bleaching earth at room temperature, and, accordingly, the polymerization is usually carried out by adding monomeric styrene to a but moderately heated suspension of the catalyst in liquid polymeric styrene. The reaction takes place smoothly and the polymerized product may continuously be withdrawn from the reactor. When operating at temperatures below about 120° C. in the presence of a relatively large proportion of the reaction medium, the product consists of a liquid mixture of low molecular weight polymers which may be used directly in the manufacture of dielectric compositions, varnishes, etc. If desired, however, such liquid mixture may be fractionally distilled under vacuum to separate individual polymers therefrom.

Many of the homologs of styrene, however, are not readily polymerized by activated bleaching earths in the cold, and it is necessary to carry out the polymerization at elevated temperatures. For example, alpha-methyl-styrene is usually polymerized by adding monomeric alpha-methyl-styrene to liquid polymerized alpha-methyl-styrene and an activated bleaching earth, e. g. Florida Earth, Retrol, etc., at a temperature between 180° C. and 210° C. An alternative mode of procedure consists in leading a mixture of the catalyst and monomeric alpha-methyl-styrene into liquid polymerized alpha-methyl-styrene which has been heated to the desired temperature. The exact temperature employed in polymerizing the more difficultly polymerizable homologs of styrene depends upon the particular compound being polymerized, but should, of course, be below the boiling point of the product. In general, I prefer to carry out such polymerizations at temperatures between about 150° and about 280° C., although higher temperatures may some times be employed without materially degrading the polymeric products.

The proportion in which the catalyst is employed also varies somewhat with the compound being polymerized. In the case of styrene, a very small amount, e. g. 0.01 to 0.1 per cent by weight, of the catalyst is sufficient to effect rapid reaction, particularly when polymerizing at slightly elevated emperatures, e. g. 80°–130° C. The homologs of styrene, however, do not usually react as readily and it is preferable to employ from 0.1 to 1.0 per cent by weight of the catalyst.

A preferred mode of practicing the invention consists in heating a quantity of the liquid polymer, which acts as the reaction medium, to the desired temperature in a suitable vessel equipped with a reflux condenser to prevent loss of material by vaporization. The liquid reaction medium is preferably the mixed polymeric product obtained from a previous polymerization, but it may be prepared in any other convenient manner. A mixture of the monomeric compound and the catalyst is then led into the vessel at such rate that the reaction takes place smoothly without materially increasing the temperature. The optimum rate of addition depends somewhat on the conditions under which the polymerization is being carried out but is usually such that the amount of material undergoing polymerization at any one instant is about 5–15 per cent of the amount of polymeric reaction medium present. Simultaneous with the addition of the monomeric compound, the liquid polymerized material is drawn from the vessel and is passed through a filter press while hot to separate the catalyst. If desired, the polymerized material may be further purified by fractional distillation under vacuum. When polymerizing styrene in this manner, it is necessary to mix the catalyst with the reaction mixture rather than with the monomeric styrene, since, as hereinbefore stated, styrene is polymerized by activated bleaching earths at room temperature.

The following examples will illustrate several ways in which the principle of the invention has been applied, but are not to be construed as limiting the same.

*Example 1*

Approximately 4.0 pounds of a liquid mixture of alpha-methyl-styrene polymers was prepared by carefully heating monomeric alpha-methyl-styrene in the presence of about 0.1 per cent by weight of Retrol. A large amount of heat was liberated during the polymerization reaction, necessitating cooling in order to prevent the reaction from becoming too violent. The polymeric product prepared in this manner was maintained at 190°–200° C. in a vessel equipped with a reflux condenser, thermometer, and stirrer, and 68.0 pounds of monomeric alpha-methyl-styrene mixed with 0.1 per cent by weight of Retrol were led into the vessel at the rate of 10 pounds per hour, and at the same time liquid, polymerized alpha-methyl-styrene was continuously withdrawn from the reaction vessel at approximately the same rate as the addition of the monomeric compound. The polymerization reaction took place smoothly and without appreciable rise in temperature. Upon completion of the polymerization, the liquid mixture of alpha-methyl-styrene was fractionally distilled under vacuum to recover the individual polymers therefrom. There was obtained 6.5 pounds of unreacted monomeric alpha-methyl-styrene; 53.1 pounds of dimeric alpha-methyl-styrene, distilling at 158°–160° C. under 10 millimeters pressure; and 12.5 pounds of a mixture of the higher polymers of alpha-methyl-styrene.

*Example 2*

Approximately 2.0 grams of Retrol were mixed with 100.0 grams of monomeric styrene and the mixture was carefully heated to initiate polymerization. When the temperature of the mixture reached 60° C., a vigorous polymerization reaction took place and the temperature rapidly rose to 160° C. The polymerized product was a thick, viscous liquid and consisted of a mixture of low molecular weight polymers of styrene. This material was then heated to 150° C. and approximately 500 grams of monomeric styrene were added gradually over a period of 2 hours. The polymerization took place smoothly and rapidly and with no overheating. When the polymerization was complete, the liquid polymeric product was transferred to a still and fractionally distilled under vacuum. The following fractions were obtained:

| Fraction No. | Boiling range | Amount |
|---|---|---|
| | | Grams |
| 1 | 40° C. at 20 mm. to 156.5° C. at 12 mm | 51.7 |
| 2 | 156.5° C. at 12 mm. to 158.5° C. at 10 mm | 107.8 |
| 3 | 158.5° C. to 235° C. at 10 mm | 40.7 |
| 4 | 235° C. to 238° C. at 10 mm | 12.4 |
| 5 | Above 238° C. at 10 mm | 217.4 |

Other modes of applying the principle of my invention may be employed instead of those explained, change being made as regards the method herein disclosed, provided the step stated by any of the following claims, or the equivalent of such stated step, be employed.

I therefore particularly point out and distinctly claim as my invention:

1. In a method of polymerizing a compound selected from the group consisting of styrene and alpha-methyl-styrene, the step which consists in introducing said compound to its liquid polymer in contact with an activated bleaching earth at such a rate that the mixture contains not more than approximately 15 per cent by weight of the monomeric polymerizable compound, while maintaining the mixture at a temperature between about 80° C. and about 210° C.

2. In a method of polymerizing a compound selected from the group consisting of styrene and alpha-methyl-styrene, the step which consists in introducing a mixture of said compound and a catalytic amount of activated bleaching earth to a liquid polymer of said compound at such a rate that the mixture contains not more than approximately 15 per cent by weight of the monomeric polymerizable compound, while maintaining the mixture at a temperature between about 80° C. and about 210° C.

3. In a method of polymerizing a compound selected from the group consisting of styrene and alpha-methyl-styrene, the step which consists in introducing said compound to a liquid polymer thereof having suspended therein a catalytic amount of an activated bleaching earth at such a rate that the mixture contains not more than approximately 15 per cent by weight of a monomeric polymerizable compound, while maintaining the mixture at a temperature between about 80° C. and about 210° C.

4. In a method of polymerizing alpha-methyl-styrene, the step which consists in introducing a mixture of substantially monomeric alpha-methyl-styrene and a catalytic amount of an activated bleaching earth to liquid polymerized alpha-methyl-styrene at such a rate that the mixture contains not more than approximately 15 per cent by weight of monomeric alpha-methyl-styrene, while maintaining the mixture at a temperature between about 180° C. and about 210° C.

5. In a method of polymerizing styrene, the step which consists in introducing substantially monomeric styrene to a liquid polymer of styrene having suspended therein a catalytic amount of an activated bleaching earth at such a rate that the mixture contains not more than approximately 15 per cent by weight of monomeric styrene, while maintaining the mixture at a temperature between about 80° C. and about 150° C.

6. In a method of polymerizing alpha-methyl-styrene, the step which consists in continuously introducing a mixture of substantially monomeric alpha-methyl-styrene and from 0.1 to 1.0 per cent by weight of an activated bleaching earth to liquid polymerized alpha-methyl-styrene at such a rate that the mixture contains not more than approximately 15 per cent by weight of monomeric alpha-methyl-styrene, while maintaining the mixture at a temperature between about 180° C. and about 210° C., and continuously withdrawing liquid polymerized alpha-methyl-styrene from the mixture.

7. In a method of polymerizing styrene, the step which consists in continuously introducing substantially monomeric styrene to a liquid polymer of styrene having suspended therein from about 0.01 to about 0.1 per cent by weight of an activated bleaching earth at such a rate that the mixture contains not more than approximately 15 per cent by weight of monomeric styrene, while maintaining the mixture at a temperature between about 80° C. and about 130° C., and continuously withdrawing liquid polymerized styrene from the mixture.

8. In a method of polymerizing a polymerizable compound selected from the group consisting of vinyl aromatic compounds and alpha-alkyl-vinyl aromatic compounds, the step which consists in introducing said compound to its liquid polymer in contact with an activated bleaching earth at such a rate that the mixture contains not more than approximately 15 per cent by weight of the monomeric polymerizable compound, while maintaining the mixture at a polymerizing temperature.

ROBERT R. DREISBACH.